United States Patent Office.

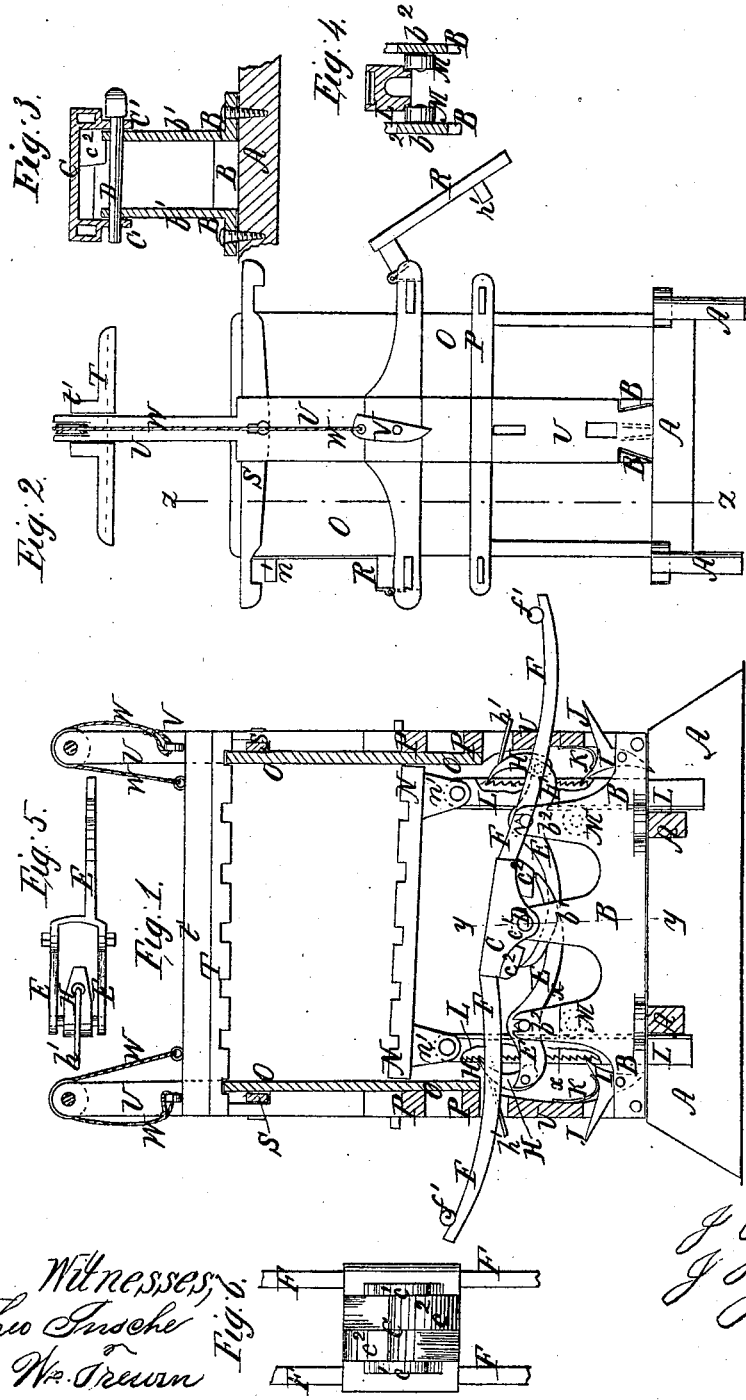

JOSEPH P. TAYLOR, OF HUDSON CITY, AND JACKSON R. BAKER, OF JERSEY CITY, NEW JERSEY.

Letters Patent No. 70,649, dated November 5, 1867.

IMPROVED BALING-PRESS.

The Schedule referred to in these Letters Patent and making part of the same.

TO ALL WHOM IT MAY CONCERN:

Be it known that we, JOSEPH P. TAYLOR, of Hudson City, in the county of Hudson, and State of New Jersey, and JACKSON R. BAKER, of Jersey City, in the county of Hudson, and State of New Jersey, have invented a new and useful Improvement in Baling-Press; and we do hereby declare that the following is a full, clear, and exact description thereof, which will enable those skilled in the art to make and use the same, reference being had to the accompanying drawings, forming part of this specification, in which—

Figure 1 is a vertical longitudinal section of our improved machine, taken through the line $z\ z$, fig. 2.

Figure 2 is an end view of the same.

Figure 3 is a detail sectional view of the same, taken through the line $y\ y$, fig. 1.

Figure 4 is a detail sectional view of the same, taken through the line $x\ x$, fig. 1.

Figure 5 is a detail view of one of the pivoted levers and lifting-pawls.

Figure 6 is a detail view of the under side of the yoke of the lifting-levers.

Similar letters of reference indicate corresponding parts.

Our invention has for its object to furnish a simple, compact, convenient, and powerful baling-press, and one which shall at the same time be easily operated; and it consists in the construction, combination, and arrangement of parts by which the follower is operated, and in the construction and arrangement of the baling-box, as hereinafter more fully described.

A is the foundation-frame of the machine, upon which rests, and to which is secured, the cast-iron bed-plate or frame B. The bed-plate B has three pairs of posts or pillars, cast solid upon or securely attached to its upper side, between and to which are pivoted the operating-levers. C is a yoke, which is pivoted to the middle posts $b^1$ by a bolt, D, passing through the upper parts of said posts, and through the ears $c^1$, formed upon the under side of the said yoke. Upon opposite corners of the under side of the yoke C are formed projections $c^2$, having smooth, inclined faces, against which the ends of the levers E rest, as shown in figs. 1 and 6. In the ends of the yoke C are formed sockets, into which are inserted the ends of the levers F, one or both pairs of which may be used, according as the machine is to be operated by one or two men. To the outer ends of the levers F are attached cross-bars or handles $f$, for convenience in operating the machine. E are levers, made in substantially the form shown in figs. 1 and 5, and pivoted near their outer ends to the end posts $b^2$ of the bed-plate or frame B, as shown in fig. 1. The inner or long arms of the levers E are curved, so as to pass around the pivoting-bolt D, and their ends rest upon the faces of the projections $c^2$ of the yoke C. To the ends of the outer or short arms of the levers E are pivoted the lifting-pawls H, which are so formed and pivoted that their own weight will hold them forward against the teeth of the rack-bars upon which they operate. To the outer sides of the lifting-pawls H are attached bars or levers $h'$, which pass out through slots in the ends of the press-frame, so that the pawls may be conveniently lifted away from the racks when it is desired that the said rack-bars should be lowered. I are the holding-pawls, which are pivoted to the bed-plate or frame B, and which are so formed and pivoted that their own weight may hold them forward against the rack-teeth, to hold the said rack-bars in place, while the lifting-pawls H are moved down to take another hold. To the outer sides of the pawls I are attached arms or levers J, which pass out through slots in the ends of the frame of the press, so that they may be easily and conveniently operated by the foot of the operator to lift the said pawls I away from the rack-bars when it is desired that they should run down. The lower ends of the pawls I project downward, and are so formed that when the said pawls are lifted away from the said rack-teeth the said lower ends of the said pawls may, by the same operation, be forced against the said rack-bars, and may act as brakes to control the movement of the said rack-bars as they are running down. To insure the pawls I being always in position to hold the rack-bars, springs K may be attached to the press-frame, so that their free ends may press the said pawls forward and hold them in place. L are the rack-bars, the teeth of which are formed in the bottom of longitudinal grooves in the outer sides of said bars, as shown in figs. 1 and 4, so that a smooth surface may be left upon the outer sides of the said bars for the lower parts of the pawls I to press against when used as brakes. In the edges of the inner sides of the rack-bars L are formed shallow grooves for the reception of the faces of the friction-wheels M, which work on pins formed upon or attached to the inner sides of the end posts $b^2$ of the bed-plate or frame B, which receive and resist the inward pressure of the rack-bars when acted upon by the pawls; and which diminish the friction, and serve as guides to the said bars as they move up and down. The upper ends of the rack-bars L are pivoted to ears or projections $n'$, formed upon or attached to the under side of the follower or platform N, so that the said bars may always retain their vertical position whichever way the platform or follower N may incline, as its ends are alternately raised by the action of the levers and pawls. The upper surface of the platform or follower N is grooved for convenience in passing the bands about the bale when sufficiently compressed, and it moves up and down through the vertical baling-box O, which is surrounded by a strong framework, P. The edges of the follower or platform N may be furnished with friction-rollers or pulleys to diminish the friction, as the said follower or platform moves up through the close baling-box O. R are the doors, which form the sides of the upper part of the box O, and which are hinged at their lower edges to the frame P. The lower edges of the doors R project a little below the bars to which the hinges are attached, as shown in fig. 2, said projecting edges entering grooves formed for their reception in the frame P, so as to relieve the hinges from the strain. The upper parts of the door are secured in place by the bars S, which extend entirely across the ends of the box O, and which have hooks or catches formed upon their ends, which hook or catch upon the ends of the bars $r'$, which extend longitudinally across the upper part of the said doors. By this construction the hook or catch-bars S and the bars $r'$ form a band or frame surrounding the baling-box, and which receives and sustains the side pressure in compressing the bale. The bars S are kept in place by stay-pins attached to their middle parts, which pass through and work freely in slots in the posts U of the press, as shown in figs. 1 and 2. T is the cover of the baling-box O, and which slides up and down upon the end posts U of the press. The cover T is made heavy, so that as it is allowed to drop down, it may force the material placed in the box O downward, packing it more closely into said box. The lower surface of the cover T is grooved or channelled for convenience in applying the bands by which the bale is secured, and the said cover is held down and secured in place by wedge-shaped keys V, passed through slots in the posts U of the press, above the ends of bar or beam $t$, to the under side of which the cover T is attached, or which forms a part of said cover. To the keys V are attached cords W, which pass over pulleys attached to the upper ends of the posts U, the other ends of said cords being attached to the said cover T. This enables the keys V to be used as handles to raise the cover, which, when raised, may be held suspended by catching the keys V upon pins projecting from the ends of the press, said pins passing through holes or slots formed in the said keys for their reception, as shown in fig. 2. The lower ends of the posts U are dove-tailed to or otherwise securely connected with the ends of the bed-plate or frame B. By this construction the bed-plate B and posts U and cover T form a band or frame, passing vertically around the press, and sustaining the strain of the pressure.

If desired, the press may be operated by any desired power by connecting the power with the outer ends of the levers F by means of a crank and connecting-rod, or by any other of the well-known devices for that purpose. By omitting the baling-box O, the press may be used for hoisting heavy weights, or for similar uses.

We claim as new, and desire to secure by Letters Patent—

1. The combination of the levers F, yoke C, levers E, lifting-pawls H, and toothed racks L, with each other, and with the follower or platform N, and bed-plate or frame B, substantially as herein shown and described and for the purpose set forth.

2. The spring-pawls I, constructed as described, having the lever J projecting through the side of the frame, to be operated upon by the foot, and the lower end projecting downward through the bottom of the press to act as a brake against the smooth surface of the vertical bars L in their descent, when the upper part of said pawl is released from the rack, as herein shown and described.

3. The arrangement of the cover T, constructed as described, ropes W, keys V, posts U, catch-bars S, and box O, as herein described for the purposes specified.

The above specification of our invention signed by us this 2d day of August, 1867.

JOSEPH P. TAYLOR,
JACKSON R. BAKER.

Witnesses:
WM. F. MCNAMARA,
JAMES T. GRAHAM.